United States Patent
Kida et al.

(10) Patent No.: US 6,529,854 B2
(45) Date of Patent: Mar. 4, 2003

(54) COORDINATE POSITION DETECTING METHOD AND DISPLAY APPARATUS USING THE SAME

(75) Inventors: Hiroshi Kida, Yamanashi-ken (JP); Masayoshi Murayama, Yamanashi-ken (JP); Masaaki Saito, Yamanashi-ken (JP); Tsutomu Ohtani, Yamanashi-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/840,189

(22) Filed: Apr. 24, 2001

(65) Prior Publication Data

US 2001/0037186 A1 Nov. 1, 2001

(30) Foreign Application Priority Data

Apr. 25, 2000 (JP) ........................................ 2000-124655

(51) Int. Cl.[7] ......................... G01C 17/00; G01C 19/00; G01C 9/00; G06F 15/00

(52) U.S. Cl. ........................................ 702/152; 346/45

(58) Field of Search ........................... 702/152; 346/45; 358/296; 345/175, 158; 347/81; 250/221

(56) References Cited

U.S. PATENT DOCUMENTS

| | | | | |
|---|---|---|---|---|
| 4,789,903 A | * | 12/1988 | Kamada et al. | 358/296 |
| 4,990,932 A | * | 2/1991 | Houston | 346/45 |
| 5,414,413 A | * | 5/1995 | Tamaru et al. | 345/175 |

* cited by examiner

Primary Examiner—John Barlow
Assistant Examiner—Xiuqin Sun
(74) Attorney, Agent, or Firm—Arent Fox Kintner Plotkin & Kahn PLLC

(57) ABSTRACT

A coordinate position detecting method uses a plurality of light emitting elements and a plurality of light receiving elements located on mutually opposite sides, all the elements being arranged at a predetermined interval in horizontal and vertical directions, with each pair of mutually opposed light emitting element and light receiving element forming a light beam path, such that the coordinate position of a light blocking object can be detected once the light beam path is blocked. The method comprises: storing N previous coordinate datas obtained when detecting a movement of the light blocking ojecte, using n ($1 \leq n \leq N$) coordinate datas of the N previous coordinate datas to calculate a coordinate position of the light blocking object; and changing the number of the coordinate datas for use in calculating the coordinate position, in accordance with a speed of the movment of the light blocking object.

10 Claims, 10 Drawing Sheets

COORDINATE POSITION DETECTING METHOD AND DISPLAY APPARATUS USING THE SAME

BACKGROUND OF THE INVENTION

The present invention relates to a coordinate position detecting method and a display apparatus involving the use of the method.

In a display apparatus such as a touch-panel for use in a plasma display panel (hereinafter referred to as PDP) or for use in a Braun tube (hereinafter referred to as CRT), it is necessary for a finger-touched position to be detected on a coordinate system.

As one method for detecting a position touched by a finger on a touch-panel, there in known a system capable of calculating a finger-touched position on a coordinate system. FIG. 10 shows one example of a coordinate system capable of optically detecting a coordinate position touched by a finger.

Referring to FIG. 10, a plurality of light emitting elements Ax1–Axn and Ay1–Ayn are respectively arranged on one longitudinal edge and one lateral edge of a display surface 1. A plurality of light receiving elements Bx1–Bxn and By1–Byn are respectively arranged on the other longitudinal edge and the other lateral edge. Infrared light beams emitted from the light emitting elements are received by the light receiving elements.

The above-described touch panel is so formed that when any optional position P (hereinafter referred to as touch position) of display surface 1 is touched by a finger or a touch pen, lights emitted from corresponding light emitting elements will be blocked, so that they will not be received by corresponding light receiving elements. By detecting the coordinate position of touch point according to X axis and Y axis, it is possible to specify the touch position p in accordance with the positions of the light receiving elements (not receiving lights at this time).

In a conventional touch panel such as the above-described touch panel, each pair of a light emitting element and a light receiving element are required to be disposed with a predetermined interval formed between them. In this way, a predetermined resolution corresponding to the number of the arranged light emitting elements and light receiving elements may be obtained. If the resolution is to be improved, it will be necessary to increase the number of the light emitting elements and the light receiving elements. As a result, the total number of the parts forming the touch panel will have to be increased, thus undesirably increasing the production cost. Moreover, if the light emitting elements and the light receiving elements are increased, a corresponding space will also have to be enlarged. However, since there is a limit in a space in which a touch panel is disposed, it is not allowed to increase the number of the light emitting elements and the light receiving elements as many as desired. On the other hand, even if it is allowed to increase the number of the light emitting elements and the light receiving elements, a circuit board for mounting an electronic circuit for processing signals will also have to be large. Consequently, in view of the space limitation, it is not easy to increase the number of the light emitting elements and light receiving elements, thus renderring it difficult to obtain an increased resolution (resolving power).

Detection of a coordinate position in each direction will be described below. In the horizontal direction (X axis direction), scanning is successively performed from the light emitting element Ax1 to the light emitting element Axn, so that a coordinate position can be detected in accordance with a position where an infrared light beam is blocked. Similarly, in the vertical direction (Y axis direction), scanning is successively performed from the light emitting element Ay1 to the light emitting element Ayn, so that a coordinate position can be detected in accordance with a position where the infrared light beam is blocked. In other words, a scanning operation is performed in X axis direction using each light emitting element arranged in X axis direction, and a scanning operation is also performed in Y axis direction using each light emitting element arranged in Y axis direction.

However, the above-described conventional scanning method needs a considerable amount of time to complete the detection of coordinate position, thus undesirably rendering the display apparatus to have only a bad operability.

Namely, it is necessary to repeatedly perform the lightening scanning from initial light emitting elements (Ax1, Ay1) to final light emitting elements (Axn, Ayn). If the number of coordinate positions (to be detected) has increased, it is necessary to have an increased amount of time for the detection, rendering it difficult to avoid a bad operability of the touch panel.

SUMMARY OF THE INVENTION

It is an object of the present invention to provide an improved coordinate position detecting method and a display apparatus using the method, ensuring an improved resolution (resolving power) and a shortened time necessary for detecting coordinate positions, as well as an improved operability for the display apparatus, thereby solving the above-mentioned problem existing in coordinate position detection in the above-discussed prior art.

In a first aspect of the present invention, there is provided a coordinate position detecting method using a plurality of light emitting elements and a plurality of light receiving elements located on mutually opposite sides, all the elements being arranged at a predetermined interval in horizontal and vertical directions, with each pair of mutually opposed light emitting element and light receiving element forming a light beam path, such that the coordinate position of a light blocking object can be detected once the light beam path is blocked, said method comprising: storing N previous coordinate datas obtained when detecting a movement of the light blocking object, using n ($1 \leq n \leq N$) coordinate datas of the N previous coordinate datas to calculate a coordinate position of the light blocking object; and changing the number of the coordinate datas for use in calculating the coordinate position, in accordance with a speed of the movement of the light blocking object.

In a second aspect of the present invention, when a moving speed of the light blocking object is high, the number of coordinate datas for use in forming the said coordinate position is reduced, when the moving speed of the light blocking object is low, the number of coordinate datas for use in forming the said coordinate position is increased.

In a third aspect of the present invention, only a predetermined number of the light emitting elements are successively caused to perform scanning operation, which light emitting elements are located before and after a coordinate position at which the light blocking object has been detected, thereby detecting the coordinate position of the light blocking object.

In a fourth aspect of the present invention, only a predetermined number of the light emitting elements are successively caused to perform scanning operation, which light emitting elements are located before and after a coordinate position at which the light blocking object has been detected, while the scanning action of other light emitting elements are reduced, thereby detecting the coordinate position of the light blocking object.

In a fifth aspect of the present invention, the number of the light emitting elements scanning in the moving direction of the light blocking object is made larger than the number of the light emitting elements scanning in a direction opposite to the moving direction of the light blocking object. When a moved amount of the light blocking object is larger than a predetermined value, the number of light emitting elements in scanning operation is increased.

In a sixth aspect of the present invention, the number of the light emitting elements scanning in the moving direction of the light blocking object is made larger than the number of the light emitting elements scanning in a direction opposite to the moving direction of the light blocking object. When a moved amount of the light blocking object is larger than a predetermined value, the number of light emitting elements in scanning operation is increased.

In a seventh aspect of the present invention, there is provided a coordinate position detecting method using a plurality of light emitting elements and a plurality of light receiving elements located on mutually opposite sides, all the elements being arranged at a predetermined interval in horizontal and vertical directions, with each pair of mutually opposed light emitting element and light receiving element forming a light beam path, such that the coordinate position of a light blocking object can be detected once the light beam path is blocked, said method comprising: storing N previous coordinate datas obtained when detecting a movement of the light blocking object, using n ($1 \leq n \leq N$) coordinate datas of the N previous coordinate datas to calculate a coordinate position of the light blocking object; and changing the number of the coordinate datas for use in calculating the coordinate position, in accordance with a speed of the movment of the light blocking object. The method further comprises: setting a first mode for successively rendering light emitting elements (in a first range including all the light emitting elements) to emit light beams to perform scanning operation, and for calculating a coordinate position at which a light beam is blocked; and setting a second mode for successively rendering light emitting elements (in a second range which is smaller than the first range but including a light emitting element corresponding to a beam-blocked position) to emit light beams and for calculating a coordinate position at which a light beam is blocked. In particular, after a beam-blocked position is calculated in the first mode, another beam-blocked position is calculated in the second mode.

In an eighth aspect of the present invention, the number of the light emitting elements scanning in the moving direction of the light blocking object is made larger than the number of the light emitting elements scanning in a direction opposite to the moving direction of the light blocking object, when a moved amount of the light blocking object is larger than a predetermined value, the number of light emitting elements in scanning operation is increased.

In a ninth aspect of the present invention, there is provided a coordinate position detecting method using a plurality of light emitting elements and a plurality of light receiving elements located on mutually opposite sides, all the elements being arranged at a predetermined interval in horizontal and vertical directions, with each pair of mutually opposed light emitting element and light receiving element forming a light beam path, such that the coordinate position of a light blocking object can be detected once the light beam path is blocked, said method comprising: storing N previous coordinate datas obtained when detecting a movement of the light blocking object, using n ($1 \leq n \leq N$) coordinate datas of the N previous coordinate datas to calculate a coordinate position of the light blocking object; and changing the number of the coordinate datas for use in calculating the coordinate position, in accordance with a speed of the movment of the light blocking object. The method further comprises: setting a first mode for successively rendering light emitting elements (in a first range including all the light emitting elements) to emit light beams to perform scanning operation, and for calculating a coordinate position at which a light beam is blocked; and setting a second mode for successively rendering light emitting elements (in a second range which is smaller than the first range but including a light emitting element corresponding to a beam-blocked position) to emit light beams, and for calculating a coordinate position at which a light beam is blocked, further for reducing and rendering light emitting elements (in the first range not including the second range) to emit light beams so as to detect the coordinate position of the light blocking object. Specifically, after a beam-blocked position is calculated in the first mode, another beam-blocked position is calculated in the second mode.

In a tenth aspect of the present invention, during the second mode, the number of the light emitting elements scanning in the moving direction of the light blocking object is made larger than the number of the light emitting elements scanning in a direction opposite to the moving direction of the light blocking object. When a moved amount of light blocking object is larger than a predetermined value, the number of light emitting elements is increased.

In an eleventh aspect of the present invention, there is provided a display apparatus involving the use of the method according to any one of claims 1, 7 and 9, said apparatus comprising: a plurality of light emitting elements arranged on one side of two mutually opposed lines, and capable of emitting infrared light beams; a plurality of light receiving elements arranged on the other side of the two mutually opposed lines, and capable of receiving infrared light beams; and a controller connected respectively with the light emitting elements and the light receiving elements.

According to the first and second aspects of the present invention, since the coordinate position can be calculated in accordance with the coordinate data containing immediately previous data in relation to a detected coordinate position, it is possible to simplify a process for newly calculating a coordinate position through a newly sampling process. Further, since the number of coordinate datas to be used can be changed in accordance with the moving speed of a light blocking object, it is possible to obtain a resolution (resolving power) in accordance with the moving speed, thereby making it possible to prevent an undesired extension of a sampling time necessary for calculating a coordinate position.

According to the third and fourth aspects of the present invention, only a predetermined number of the light emitting elements are successively detected which are located before and after a coordinate position at which the light blocking object has been detected, while the scanning action using other light emitting elements are reduced, thereby detecting the coordinate position of the light blocking object. Therefore, it is possible to shorten a necessary time for calculating a coordinate position without lowering the resolution (resolving power).

According to the fifth and sixth aspects of the present invention, the number of the light emitting elements scanning in the moving direction of the light blocking object is made larger than the number of the light emitting elements scanning in a direction opposite to the moving direction of the light blocking object. Therefore, it is possible for the light emitting elements to perform a dense scanning operation ahead of the moving light blocking object. In other words, since it is possible that on the side away from the moving direction of light blocking object, the light emitting elements in scanning operation can be reduced, it is possible to shorten a necessary time for calculating a coordinate position without lowering the resolution (resolving power).

According to the seventh and ninth aspects of the present invention, a first mode is set for successively rendering light emitting elements (including all the light emitting elements) to emit light beams, a second mode is set for successively rendering light emitting elements (fewer than all the light emitting elements but containing a light emitting element corresponding to a beam-blocked position) to emit light beams. When the beam-blocked position calculated in the first mode has changed, the changed position is calculated not by the first mode but by the second mode. At this time, it is not necessary to use the first mode to render all the light emitting elements to emit light beams to perform full stroke scanning operation, but is allowed to perform only a short stroke scanning which is capable of calculating a beam-blocked position, thereby making it possible to require only a shorter time for calculating a beam-blocked potion than in the first mode.

According to the eighth and tenth aspects of the present invention, since it is possible that in the second mode, the number of the light emitting elements in scanning operation can be changed in accordance with the moving speed of the light blocking object, it is possible to shorten a necessary time for calculating a beam-blocked position, without decreasing the resolution (resolving power).

According to the eleventh aspect of the present invention, a controller can be used to set scanning operations of the light emitting elements corresponding to a moving speed of the light blocking object, thereby making it possible to shorten a necessary time for calculating a beam-blocked position, without decreasing the resolution (resolving power).

The above objects and features of the present invention will become better understood from the following description with reference to the accompanying drawings.

DETAILED DESCRIPTION OF THE PREFERRED EMBODIMENTS

An embodiment of the present invention will be described below with reference to the accompanying drawings.

Figure 1:
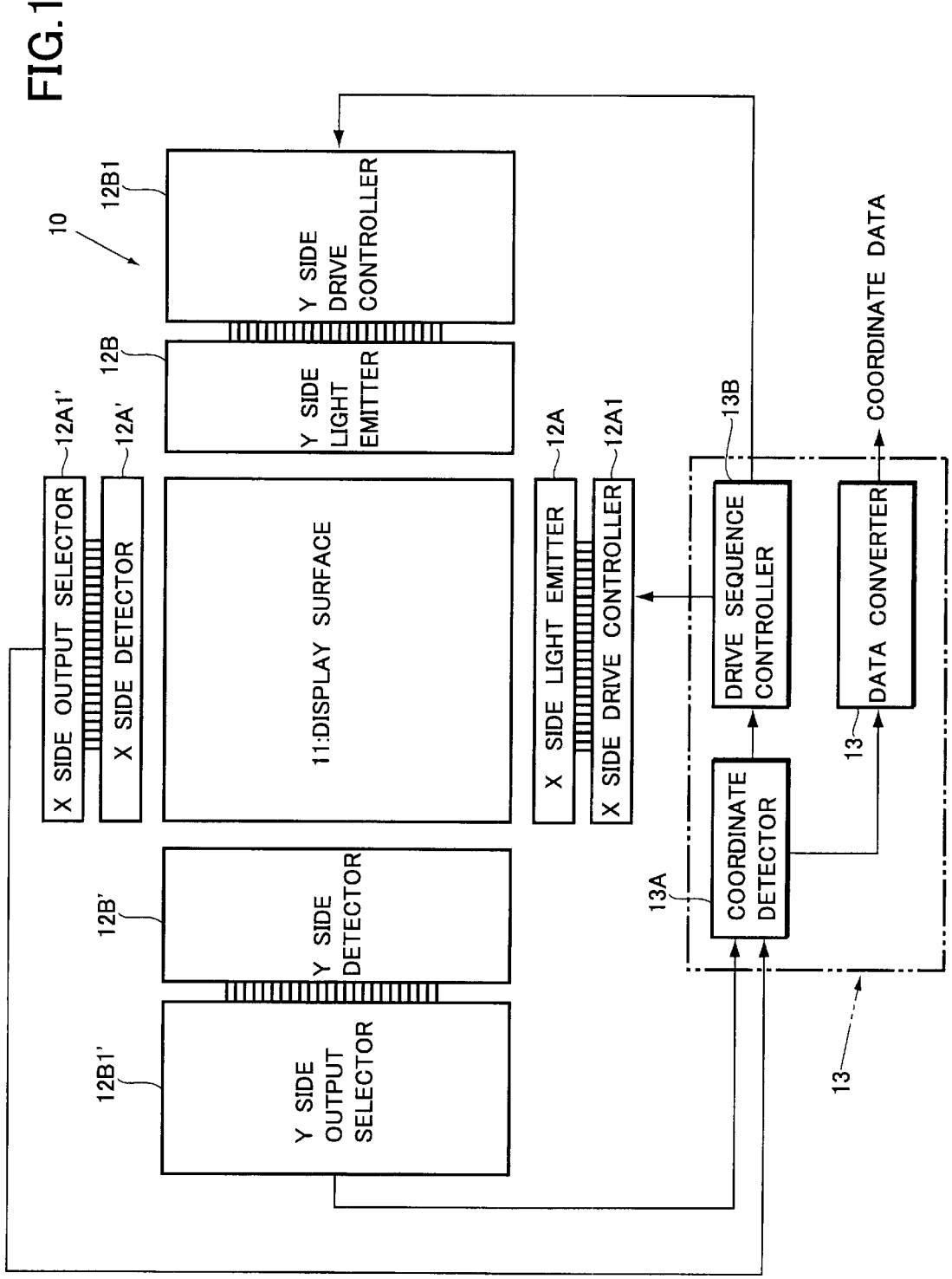
FIG. 1 is a block diagram showing the construction of a controller for use in the display apparatus formed according to the present invention.

FIG. 1 is a block diagram showing a display apparatus using the coordinate position detecting method of present invention.

As shown in the figure, a display apparatus 10 such as a touch panel has a display section 11 surrounded by horizontally arranged elongate sections and vertically arranged elongate sections.

One of the horizontally arranged elongate sections is alight emitter 12A containing a plurality of light emitting elements arranged at a predetermined interval in the horizontal direction. Another of the horizontally arranged elongate sections is a light emitter 12B containing a plurality of light emitting elements arranged at a predetermined interval in the vertical direction.

Arranged on the opposite side of the light emitter 12A is a light detector 12A' containing a plurality of light receiving elements arranged at a predetermined interval in the horizontal direction. Similarly, arranged on the opposite side of the light emitter 12B is a light detector 12B' containing a plurality of light receiving elements arranged at a predetermined interval in the vertical direction.

The light emitters 12A and 12B are connected with drive controllers 12A1 and 12A2 for driving the lightening of these light emitters 12A and 12B. The light detectors 12A' and 12B' are connected with output selectors 12A1' and 12B1' adapted to send photoelectric signals from the light detectors to a controller 13 (which will be described later).

In the present embodiment, the light emitters 12A and 12B and the light detectors 12A' and 12B' are each equipped with light emitting elements or light receiving elements, involving a plurality of blocks with each containing 8 (light emitting or receiving) elements. In this manner, 28 blocks are arranged in the horizontal direction (containing 224 elements), while 16 blocks are arranged in the vertical direction (containing 128 elements).

The controller 13 includes a coordinate detector 13 for detecting coordinate position in accordance with signals sent from the output selectors 12A1' and 12B1', a driving sequence controller 13B for setting lightening sequence for the light emitters 12A and 12B, a data converter 13C for converting each coordinate position detected in the coordinate detector 13A into coordinate data signal.

The controller 13 is provided to calculate coordinate positions in which the infrared light beams emitted from the light emitters 12A and 12B are blocked before arriving at the light detectors 12A', 12B'.

In order to effectively specify coordinate positions, the controller 13 is set at a high resolving power coordinate position detection mode.

This mode may be set on the base of the following manner. Namely, N coordinate datas (obtained when a light blocking object (stylus) was detected) is stored, an intermediate coordinate of inter-element is detected so as to increase the resolution (resolving power), followed by changing the number of detected coordinate datas (for use in coordinate detection) in accordance with a moved amount of the light blocking object (stylus). The reason for setting the above mode may be described below.

Namely, if a coordinate detected by an optical type coordinate detecting apparatus is reflected at a coordinate of a pointer of a display, the light blocking object (stylus) will have an extremely slight vibration which will cause the pointer on the display to drift so that its position is not stable between adjacent pixels. For this reason, it is difficult to drawn a straight line (even if a straight line is drawn, it will be uneven on its surface).

On the other hand, since the resolution of an optical type coordinate detecting apparatus is lower than the resolution of a display, as a method for forming an intermediate coordinate of an optical element (for use in coordinate position detection), it is possible to store a previously detected coordinate datas (of an optical type coordinate detecting apparatus) in a memory, thereby calculating a coordinate of the pointer on the display by operating a number of closely located coordinate datas. If the number of the datas used in the operation is increased, it would be possible to eliminate the uneven state of a straight line drawn. On the other hand, if a great number of datas are used to perform the above operation, it would be difficult for the pointer to follow the movement of light blocking object (stylus), making it necessary to have a long time to calculate a coordinate position. For this reason, elimination of an uneven state is just an opposite action of improvement of the followability (for the pointer to follow the light blocking object (stylus)).

In the present embodiment, by changing the number of coordinate datas (for use in operation) in accordance with a moving speed of the light blocking object (stylus), it is possible to eliminate the uneven state of each drawn straight line as well as to improve the followability of the pointer. In detail, when the moving speed of the light blocking object (stylus) is high, the number of coordinate datas (for use in operation) is reduced so as to improve the pointer's followability. On the other hand, when the moving speed of the light blocking object (stylus) is low, the number of coordinate datas (for use in operation) is increased so as to eliminate the uneven state of each drawn straight line.

Figure 2:
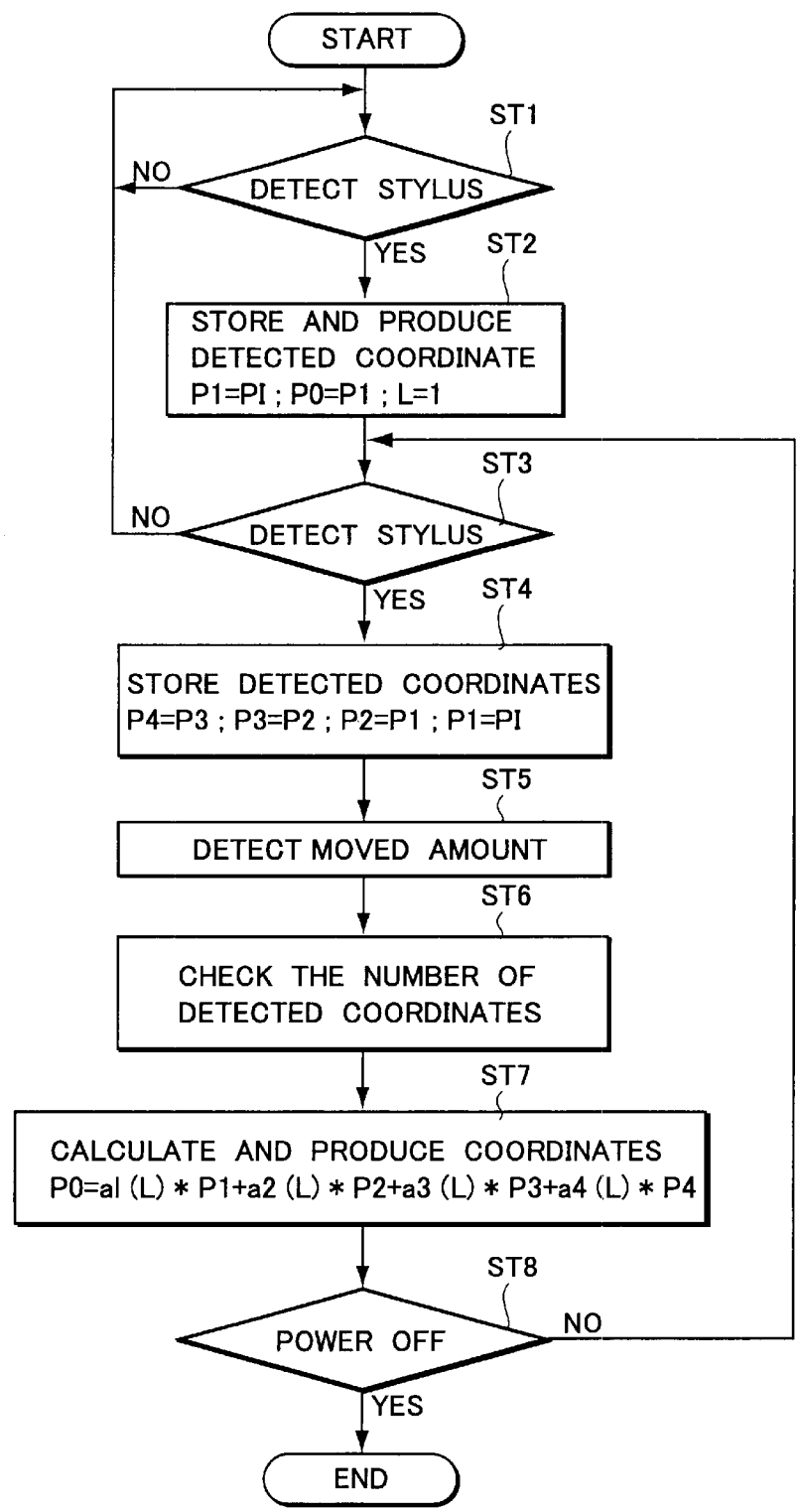
FIG. 2 is flow chart showing an operation of the controller shown in FIG. 1.

FIG. 2 is a flow chart showing the operation of the controller 13 when carrying out a high resolving power coordinate position detection mode.

In FIG. 2:

L : integration level

P1–P4: previous data stored a1(L)–a4(L): coefficients (functions of L)

PI: detected coordinate

PO: output coordinate

In accordance with a moved amount of the light blocking object, when the number of coordinate datas (for use in operation) representing an integration level is set between 2 and 4, the light blocking object (stylus) begins to be detected. Once the infrared light beam is blocked by the light blocking object (step ST1), the coordinate position of the light blockage is calculated, stored and then produced (step ST2).

Once the detected coordinate position of the light blocking object is produced, scanning operation is performed using a predetermined number of light emitting elements located before and after the detected coordinate position (step ST3). Then, other coordinate positions detected in accordance with the scanning before and after the previously detected coordinate position of the light blocking object are stored (step ST4). Further, a moved amount of the light blocking object away from the coordinate positions at ST2 and ST4 are detected (step ST5). Subsequently, the number of detected coordinates for output in accordance with the moved amount of the light blocking object are checked (step ST6). If coordinates have been newly detected, the detected coordinate positions equal to an already-set number are used to calculate the coordinate position of the light blocking object (step ST7). This operation is continued until the electric power is turned off, thereby making it possible to keep indexing the coordinate position of the light blocking object (step ST8)

Figure 3:
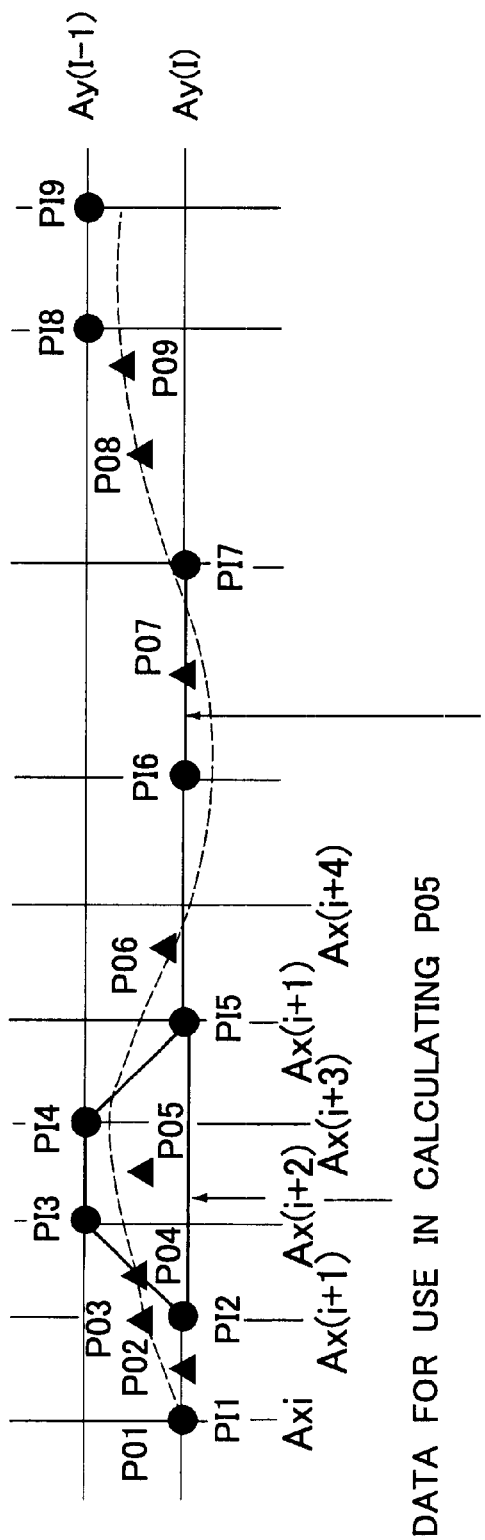
FIG. 3 is a graph showing the operation of a high resolution coordinate position detection mode executed in accordance with the flow chart shown in FIG. 2.

FIG. 3 is a graph showing an operation for determining the number of coordinate datas, which shows an example with each parameters having the following values.

a1(2)=0.5, a2(2)=0.5, a3(2)=0, a4(2)=0 a2(3)=0.33, a2(3)=0.33, a3(3)=0.33, a4(3)=0 a2(4)=0.25, a2(4)=0.25, a3(4)=0.25, a4(4)=0.250

As shown in FIG. 3, when a detected coordinate is between PI1–PI5 and PI8–PI9, a moving amount of the light blocking object is small. On the other hand, when a detected coordinate is between PI6–PI8, a moving amount of the light blocking object is large.

Each output coordinate can be deducted by using detected coordinates having a number corresponding to a moved amount of the light blocking object, in accordance with the following equations.

(A) L=1:P01=PI1

(B) L=2:P02=0.5*PI1+0.5*PI2,
P07=0.5*PI6+0.5PI7, P08=0.5*PI7+0.5*PI8

(C)L=3:P03=0.33*PI1+0.33*PI2+0.33*PI3,
P06=0.33*PI4+0.33*PI5+0.33*PI6, P09=0.33*PI7+0.33*PI8+0.33PI9

(D) L=4:P04
P04=0.25*PI1+0.25PI2+0.25PI3+0.25P*I4
P05=0.25*PI2+0.25PI3+0.25PI4+0.25*PI5

As indicated in the above, (B) uses two previous datas, (C) uses three previous datas, (D) uses four previous datas. A smaller moved amount of the light blocking object requires a larger number of coordinate datas. For example, an output coordinate in relation to PO5 when the light blocking object has moved a small amount, uses four datas in PI1–PI4. On the other hand, an output coordinate in relation to PO7 when the light blocking object has moved a large amount, uses two datas in PI6–PI7. In this way, it is possible to improve the picture drawing capability in the case where the light blocking object has moved a small amount, thereby increasing the resolving power.

In the above-described mode, it is allowed to use a reduced number of light emitting elements during a time period until the light blocking object (stylus) has been detected. Once the light blocking object is detected, the detected position can be used as a borderland and it is possible to perform scanning operation using a predetermined number of light emitting elements located before and after the light emitting elements corresponding to the detected position.

In this way, by differing scanning states with a detected position of the light blocking object serving as a borderland, it is possible to prevent a wasteful extension of the scanning time.

Another embodiment of the present invention will be described in the following with reference to FIGS. 4–6.

Figure 4:
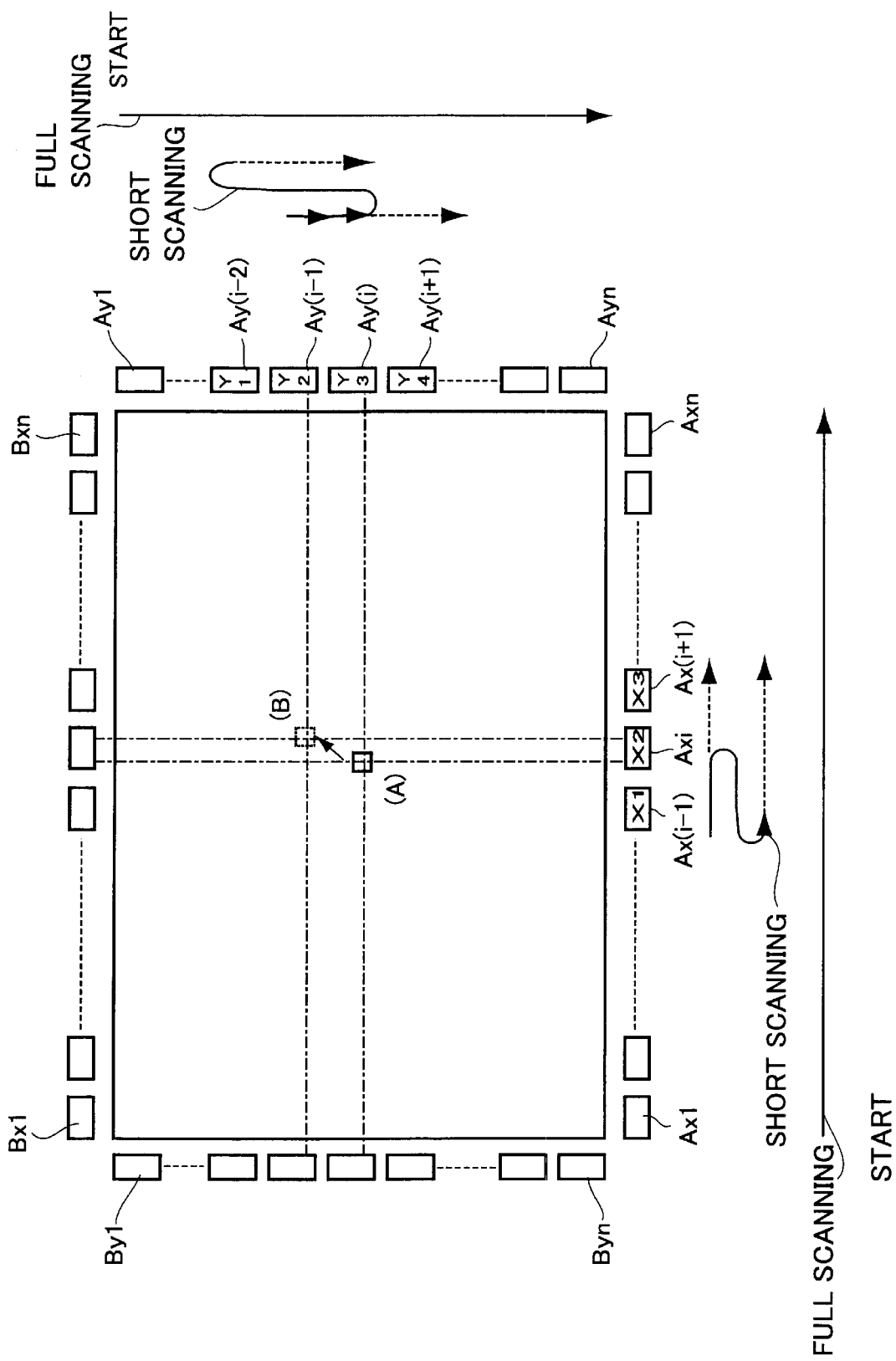
FIG. 4 is an explanatory view showing the operations of the first mode and the second mode executed by the controller shown in FIG. 1.

FIG. 4 is an explanatory view showing a first mode and a second mode set in the controller 13. In fact, the first mode and the second mode can be carried out in parallel with the high resolving power coordinate position detection mode described in accordance with FIG. 2.

(1) full scanning mode (first mode)

The first mode is provided to scan the entire area on the screen, as will be described with reference to FIG. 4.

In fact, FIG. 4 is also an explanatory view showing an arrangement of the light emitters 12A, 12B and the light detectors 12A', 12B' of FIG. 1. In FIG. 4, the light emitter (represented by 12A in FIG. 1) arranged in the direction of X axis is represented by Ax1–Axn, the light detector (represented by 12A' in FIG. 1) arranged in the direction of X axis is represented by Bx1–Bxn. Similarly, the light emitters and the light detectors includes a plurality of blocks with each containing 8 (light emitting or receiving) elements. Furthermore, the light emitter (represented by 12B in FIG. 1) arranged in the direction of Y axis is represented by Ay1–Ayn, the light detector (represented by 12B' in FIG. 1) arranged in the direction of Y axis is represented by By1–Byn.

As shown in FIG. 4, the full scanning mode (the first mode) uses the light emitting blocks Ax1–Axn, with Ax1 representing a first light emitting block located at an initial position of scanning operation, while Axn representing a last light emitting block located at an end position of scanning operation. In this way, infrared light beams are successively emitted from the light emitting elements contained in these light blocks, thereby effecting repeated scanning in vertical direction.

(2) short scanning mode (second mode)

The second mode is provided to perform scanning in an range including beam-blocked position detected by the first mode, which range is narrower than that scanned by the full scanning mode (the first mode).

For example, as shown in FIG. 4, when a position shown by (A) is a position at which an infrared light beam is blocked, a new scanning range is set which is located before and after a light emitting block X2 containing a light emitting element Axi capable of indexing the blockage position. At this time, the scanning begins with an initial light emitting element Ax(i−1) contained in the light emitting block X1 which is located immediately before the light emitting block X2 (containing the light emitting element Axi), and ends with a last light emitting element Ax(i+1) contained in the light emitting block X3 which is located immediately after the light emitting block X2.

The same scanning operation according to the short scanning mode can also be executed in the vertical direction, corresponding to the light emitting blocks Ax1–Axn arranged in the horizontal direction.

The controller 13 operates in a manner such that once the infrared light beam is blocked during the scanning according to the full scanning mode (the first mode), the short scanning mode (the second mode) will soon be started using the light emitting blocks located before and after the light emitting block corresponding to a coordinate position at which the infrared light beam is blocked. Thus, the scanning range at this time is narrow.

In this way, since the short scanning mode (the second mode) has a narrower scanning range than that required by the full scanning mode (the first mode), the scanning time when carrying out the second mode can be greatly shortened.

Further, in the short scanning mode (the second mode), it is allowed to calculate, within only a narrow range, but in the same manner as in the full scanning mode (the first mode), a coordinate position at which the infrared light beam has been blocked. Accordingly, during the short scanning mode (the second mode), when a beam-blocked coordinate position has been detected, if the coordinate position is located before the last light emitting block within a limited range, it is allowed not to perform the scanning operation using the last light emitting block, whereas the light emitting block containing the light emitting element corresponding to the detected coordinate position can be used as a borderland to start another scanning operation over a range including light emitting blocks located before and after the borderland.

Figure 5:
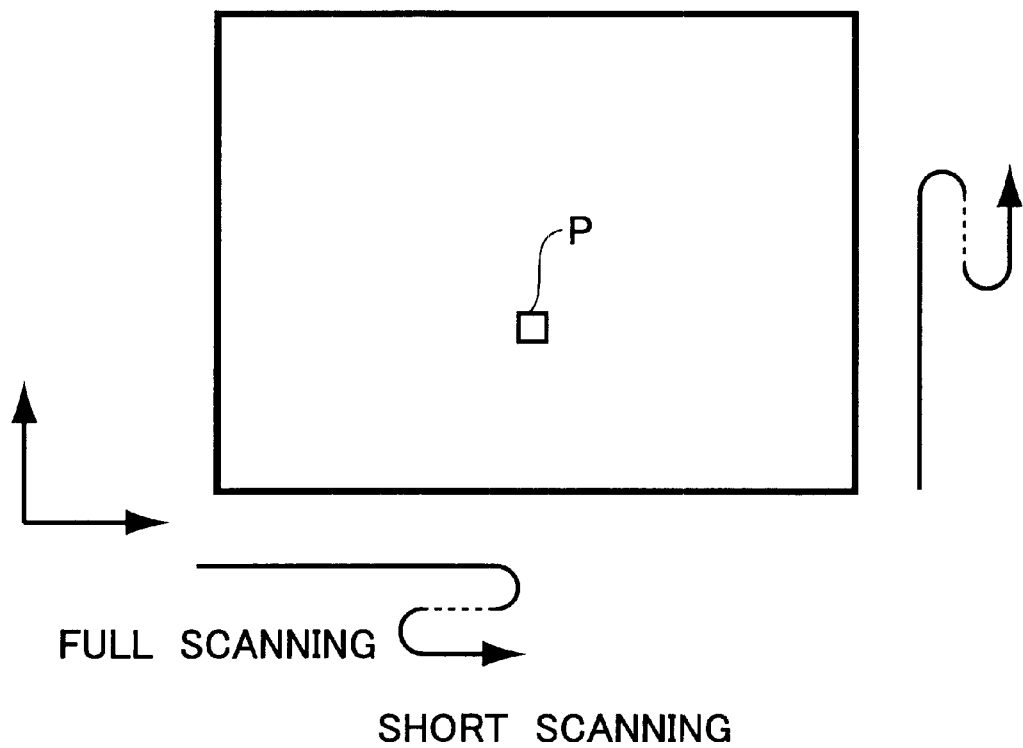
FIG. 5 is an explanatory view showing the principle of the first mode and the second mode shown in FIG. 4.

FIG. 5 is an explanatory view showing a scanning state when the full scanning mode (the first mode) is changed-over to the short scanning mode (the second mode). As shown in FIG. 5, during the full scanning mode (the first mode), once the infrared light beam is blocked, the full scanning mode will be changed-over to a different scanning over a range including the light emitting blocks located before and after a light emitting block corresponding to a coordinate position at which infrared light beam is blocked. For this reason, a scanning range during the short scanning mode (the second mode) may be so set that it begins with a position immediately before the coordinate position at which the infrared light beam is blocked and ends with a position immediately after the coordinate position.

Accordingly, when the beam-blocked coordinate position is detected by the full scanning mode (the first mode), a next scanning is required to contain only the beam-blocked coordinate position (not necessary to scan the entire area in the directions of X, Y axes), thereby desirably reducing the scanning time.

In this way, the short scanning mode (the second mode) is provided such that whenever a beam-blocked coordinate position is detected within a predetermined range, the light emitting block containing the light emitting element corresponding to the detected coordinate position can be used as a borderland to start another scanning over a range including light emitting blocks located before and after the borderland, thereby repeating the operation in accordance with the short scanning mode (the second mode).

Figure 6:
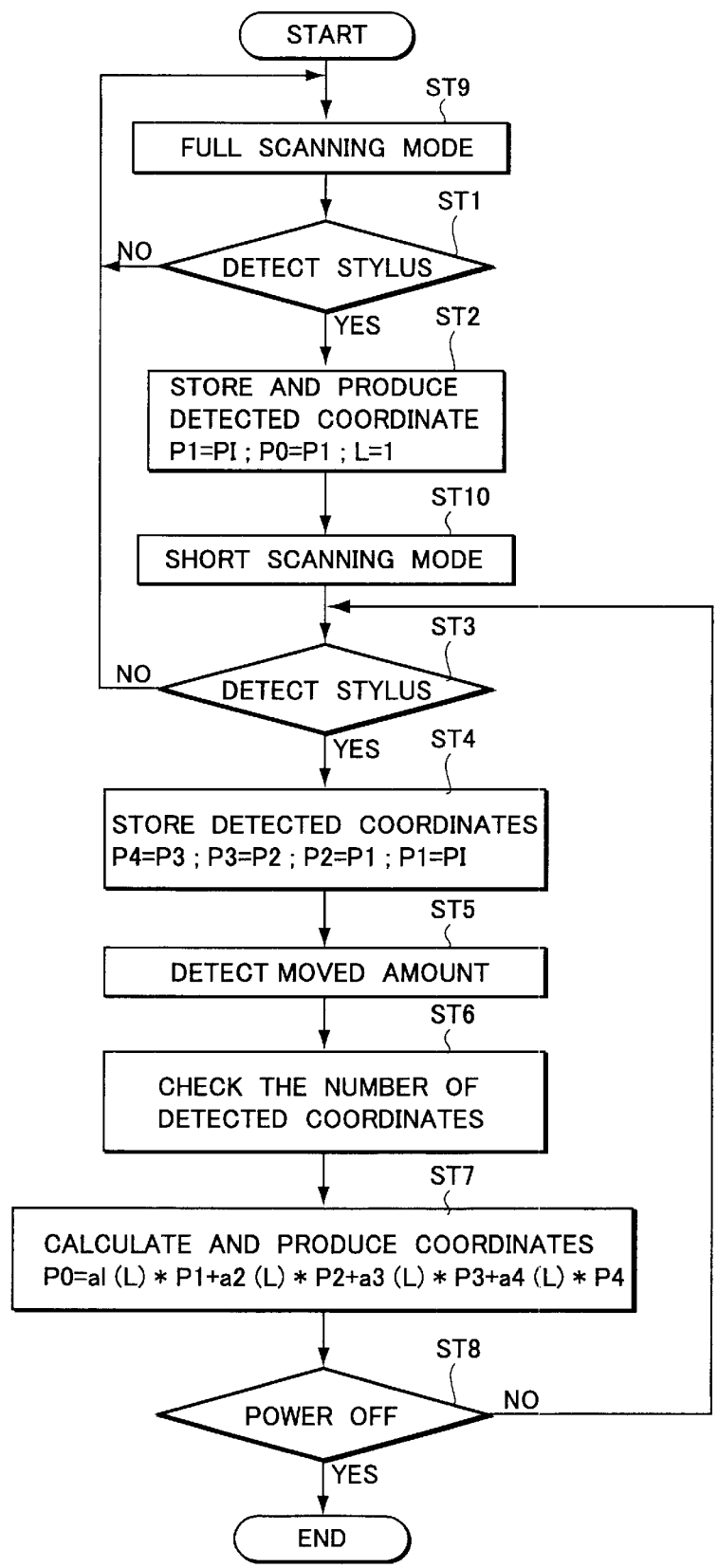
FIG. 6 is a flow chart showing an operation of the controller, reflecting the first mode and the second mode shown in FIG. 4.

FIG. 6 is a flow chart showing another operation of the controller 13. As shown in FIG. 6, once the display apparatus 10 is turned ON, the scanning is started (shown as "start" in FIG. 6), so that the full scanning mode (the first mode) is executed (step ST9).

When an infrared light beam is blocked, the beam-blocked coordinate position is calculated and stored (step ST2), in the same manner when executing a high resolution coordinate position detection treatment.

Once a detected coordinate position of a light blocking object is produced, a scanning in accordance with the short scanning mode is carried out (step ST10), using a predetermined number of light emitting elements located before and after the detected coordinate position. Then, other coordinate positions detected in accordance with the scanning before and after the previously detected coordinate position of the light blocking object are stored (step ST4). Then, a moved amount of the light blocking object away from the coordinate positions at ST2 and ST4 are detected (step ST5) Subsequently, the number of detected coordinates for output in accordance with the moved amount of the light blocking object are checked (step ST6). If coordinates have been newly detected, the detected coordinate positions equal to an already-set number are used to calculate the coordinate position of the light blocking object (step ST7). This operation is continued until the electric power is turned off, thereby making it possible to keep indexing the coordinate position of the light blocking object (step ST8).

Then, according to the present embodiment, when executing the full scanning mode, once the coordinate position of the light blocking object is detected, the full scanning mode can be changed-over to the short scanning mode which performs the scanning only in a predetermined range, thereby making it possible to increase the coordinate position detection speed.

A still further embodiment of the present invention will be described in the following with reference to FIGS. 7–9.

Figure 7:
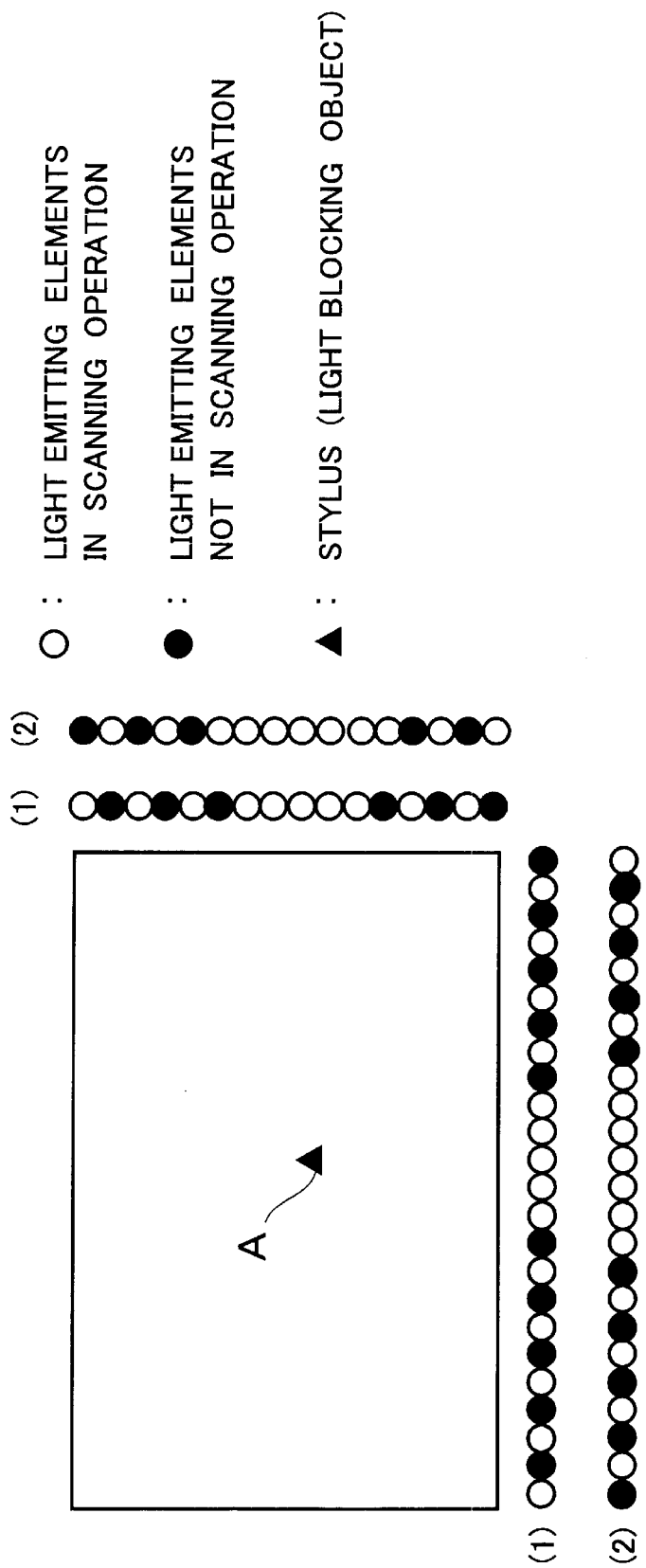
FIG. 7 is an explanatory view showing an operation of a compression scanning mode executed by a controller shown in FIG. 1.

FIG. 7 is an explanatory view showing a compression scanning mode set in the controller 13. This mode is provided such that when executing a high resolution coordinate position detection treatment and when a coordinate position of the light blocking object has been detected, the number of light emitting elements in scanning operation in the vicinity of the detected coordinate position is increased, while the light emitting elements in canning operation in other areas are reduced, thereby shortening a necessary time for carrying out one scanning cycle.

In FIG. 7, white circular marks are used to represent the light emitting elements being used in scanning, while black circular marks are used to represent the light emitting elements not being used in scanning.

As shown in FIG. 7. the light emitting elements (white circular marks) are those located in positions corresponding to a coordinate position at which the stylus is detected, while other light emitting elements (black circular marks) are used in scanning operation only one by one. In the present embodiment, the scanning operation is performed in accordance with a procedure shown by (1) or (2) in FIG. 7. Alternatively, the scanning operation may be carried out by alternatively using both the procedure (1) and the procedure (2).

Figure 8:
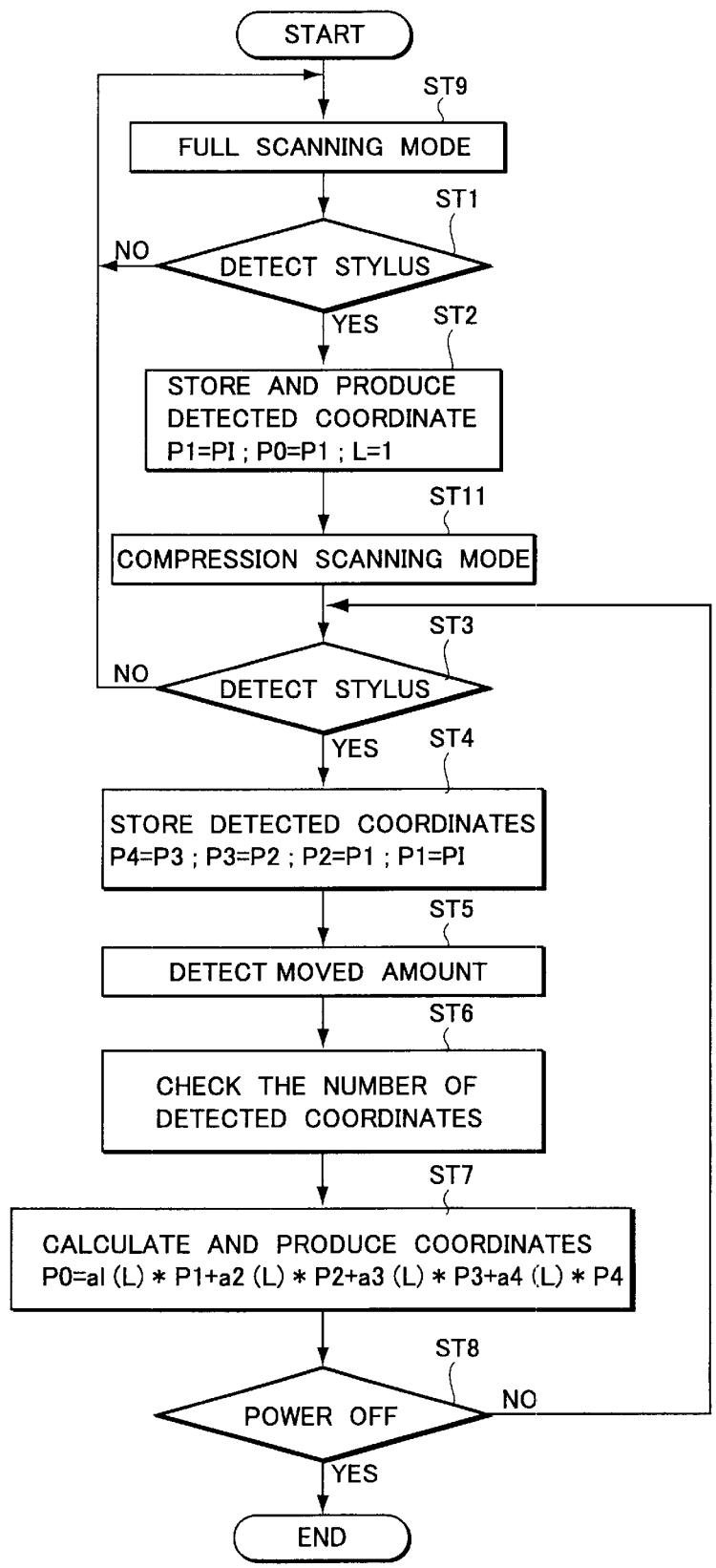
FIG. 8 is a flow chart showing an operation of the controller, reflecting the compression canning mode shown in FIG. 7.

FIG. 8 is a flowchart showing how to execute the compression scanning mode by the controller 13. Similar to the process shown in FIG. 6, at first the full scanning mode (the first mode) is executed (step ST9).

In the full scanning mode, when an infrared light beam is blocked, the beam-blocked coordinate position is calculated and stored (step ST2), in the same manner when executing a high resolution coordinate position detection treatment.

Once a detected coordinate position of a light blocking object is produced, the detected coordinate position is used as a reference position and its adjacent light emitting elements are used to successively effect a scanning operation. Meanwhile, a scanning operation using the light emitting elements in other positions is performed in accordance with the procedure shown in FIG. 7, thereby executing a compression scanning mode (step ST11).

Once the compression mode is executed (step ST11), coordinate positions detected in accordance with the scanning performed in the vicinity of the detected coordinate position are stored (step ST4). Then, a moved amount of the light blocking object away from the coordinate positions at ST2 and ST4 are detected (step ST5). Subsequently, the number of detected coordinates for output in accordance with the moved amount of the light blocking object are checked (step ST6) . If coordinates have been newly detected, the detected coordinate positions equal to an already-set number are used to calculate the coordinate position of the light blocking object (step ST7). This operation is continued until the electric power is turned off, thereby making it possible to keep indexing the coordinate position of the light blocking object (step ST8).

According to the present embodiment, similar to a process shown in FIG. 6, since it is possible to omit the scanning operation in areas other than those belonging to the vicinity of the light blocking object, a time period for each scanning cycle is shorter than the full scanning operation.

Figure 9:
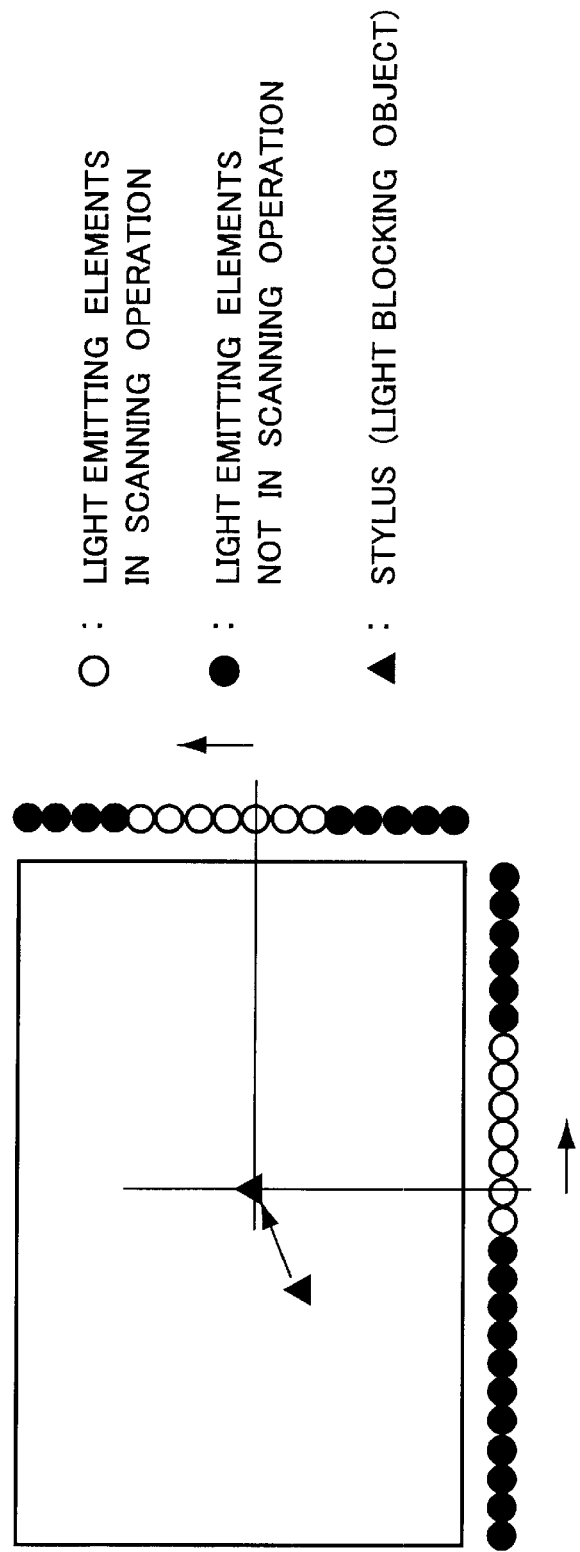
FIG. 9 is an explanatory view showing a modified embodiment of the compression scanning mode shown in FIG. 7.
Figure 10:
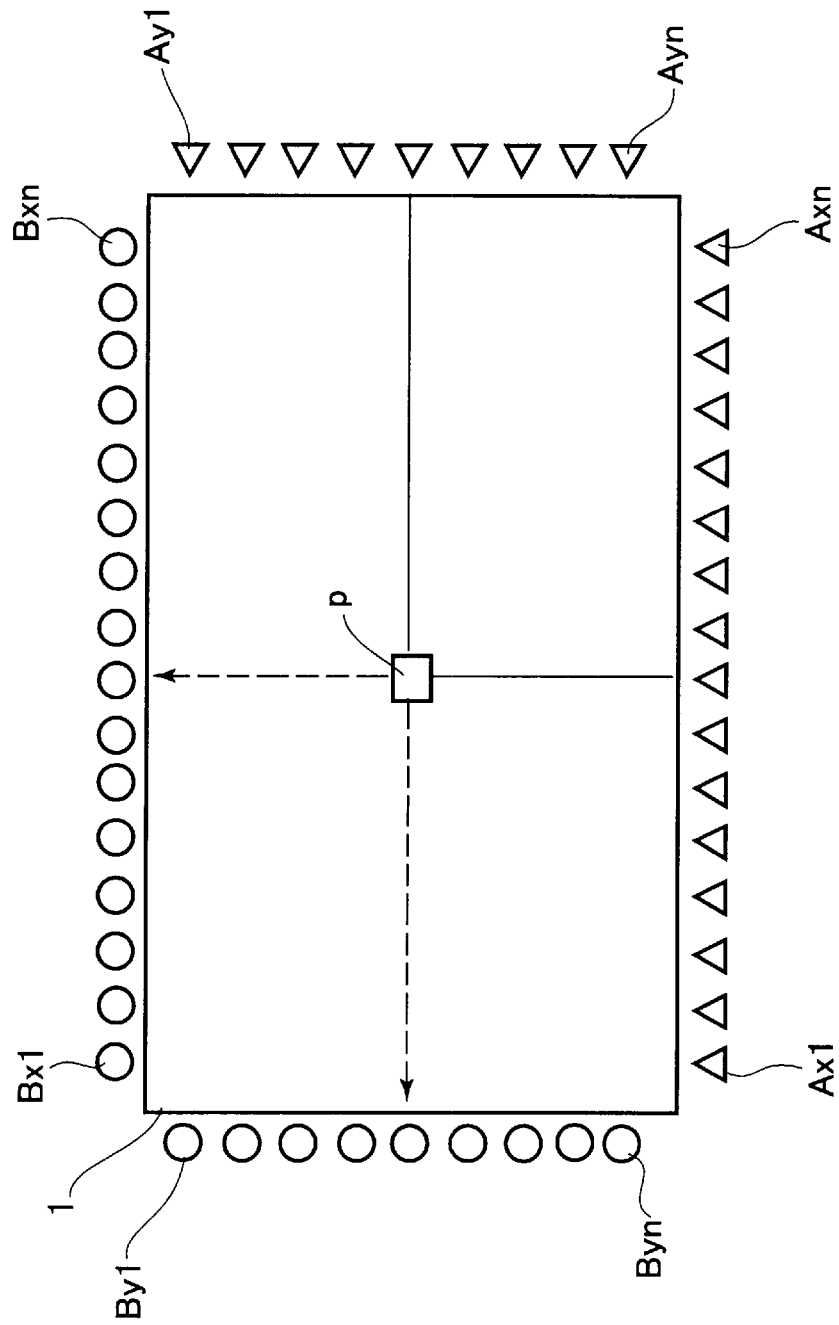
FIG. 10 is an explanatory view showing a conventional coordinate position detection device for use in a touch panel of a display apparatus.

FIG. 9 shows a further embodiment formed by modifying the embodiment of FIG. 7. As shown in FIG. 9, once the coordinate position of the light blocking object is detected, the scanning operation of the light emitting elements are shifted along a direction in accordance with the moving direction of the light blocking object (in the figure, the scanning directions of the light emitting elements are shown by two arrows indicated along a row and a column of the light emitting elements). Namely, the scanning actions of the light emitting elements located away from the moving direction of the light blocking object are reduced, so as to inhibit useless scanning operations in the ranges away from the light block object's moving direction. In this way, since the light emitting elements located away from the moving direction of the light blocking object are caused not to produce scanning actions (when they are not contributive to the detection of the light blocking object), it is possible to shorten the necessary scanning time by limiting the scanning ranges in each light emitting element arranging direction.

In the above embodiments, when a moved amount of the light blocking object is large as compared with the case in which the moved amount of the light blocking object is small, it is allowed to increase the number of light emitting elements in scanning operation. In this way, when a moved amount of the light blocking object is large, since a scanning area can also be made large, it is allowed to ensure an improved operability.

According to the first and second aspects of the present invention, since the coordinate position can be calculated in accordance with the coordinate data containing immediately previous data in relation to a detected coordinate position, it is possible to simplify a process for newly calculating a coordinate position through a newly sampling process. Further, since the number of coordinate datas to be used can be changed in accordance with the moving speed of a light blocking object, it is possible to obtain a resolution (resolving power) in accordance with the moving speed, thereby making it possible to prevent an undesired extension of a sampling time necessary for calculating a coordinate position.

According to the third and fourth aspects of the present invention, only a predetermined number of the light emitting elements are successively detected which are located before and after a coordinate position at which the light blocking object has been detected, while the scanning action using other light emitting elements are reduced, thereby detecting the coordinate position of the light blocking object. Therefore, it is possible to shorten a necessary time for calculating a coordinate position so as to improve a desired operability, without lowering the resolution (resolving power).

According to the fifth and sixth aspects of the present invention, the number of the light emitting elements scanning in the moving direction of the light blocking object is made larger than the number of the light emitting elements scanning in a direction opposite to the moving direction of the light blocking object. Therefore, it is possible for the light emitting elements to perform a dense scanning operation ahead of the moving light blocking object. In other words, since it is possible that on the side away from the moving direction of the light blocking object, the light emitting elements in scanning operation can be reduced, it is possible to shorten a necessary time for calculating a coordinate position while at the same time to improve the resolution (resolving power) when detecting a coordinate position in the moving direction of the light blocking object. In this way, it is possible to ensure an improvement of the operability as well as an improvement of the resolution.

According to the seventh and ninth aspects of the present invention, a first mode is set for successively rendering light emitting elements (including all the light emitting elements) to emit light beams, a second mode is set for successively rendering light emitting elements (fewer than all the light emitting elements but containing a light emitting element corresponding to a beam-blocked position) to emit light beams. When the beam-blocked position calculated in the first mode has changed, the changed position is calculated not by the first mode but by the second mode. At this time, it is not necessary to use the first mode to render all the light emitting elements to emit light beams to perform full stroke scanning operation, but is allowed to perform only a short stroke scanning which is capable of calculating a beam-blocked position, thereby making it possible to require only a shorter time for calculating a beam-blocked potion than in the first mode.

According to the eighth and tenth aspects of the present invention, since it is possible that in the second mode, the number of the light emitting elements in scanning operation can be changed in accordance with the moving speed of the light blocking object, it is possible to shorten a necessary time for calculating a beam-blocked position, without decreasing the resolution (resolving power). Thus, it is possible to ensure an improvement of operability.

According to the eleventh espect of the present invention, a controller can be used to set scanning operations of the light emitting elements corresponding to a moving speed of the light blocking object, thereby making it possible to shorten a necessary time for calculating a beam-blocked position, without decreasing the resolution (resolving power). Therefore, it is possible to ensure an improvement of operability. While the presently preferred embodiments of the invention have been shown and described above, it is to be understood that these disclosures are for the purpose of illustration and that various changes and modifications may be made without departing from the scope of the invention as set forth in the appended claims.

What is claimed is:

1. A coordinate position detecting method using a plurality of light emitting elements and a plurality of light receiving elements located on mutually opposite sides, all the elements being arranged at a predetermined interval in horizontal and vertical directions, with each pair of mutually opposed light emitting element and light receiving element forming a light beam path, such that the coordinate position of a light blocking object can be detected once the light beam path is blocked, said method comprising:

storing N previous coordinate datas obtained when detecting a movement of the light blocking object, using n ($1 \leq n \leq N$) coordinate datas of the N previous coordinate datas to calculate a coordinate position of the light blocking object; and changing the number of the coordinate datas for use in calculating the coordinate position, in accordance with a speed of the movement of the light blocking object;

wherein when a moving speed of the light blocking object is high, the number of coordinate datas for use in forming the said coordinate position is reduced, when the moving speed of the light blocking object is low, the number of coordinate datas for use in forming the said coordinate position is increased.

2. A coordinate position detecting method according to claim 1, wherein only a predetermined number of the light emitting elements are successively caused to perform scanning operation, which light emitting elements are located before and after a coordinate position at which the light blocking object has been detected, thereby detecting the coordinate position of the light blocking object.

3. A coordinate position detecting method according to claim 2, wherein the number of the light emitting elements scanning in the moving direction of the light blocking object is made larger than the number of the light emitting elements scanning in a direction opposite to the moving direction of the light blocking object.

4. A coordinate position detecting method according to claim 1, wherein only a predetermined number of the light emitting elements are successively caused to perform scanning operation, which light emitting elements are located before and after a coordinate position at which the light blocking object has been detected, while the scanning action of other light emitting elements are reduced, thereby detecting the coordinate position of the light blocking object.

5. A coordinate position detection method according to claim 4, wherein the number of the light emitting elements scanning in the moving direction of the light blocking object is made larger than the number of the light emitting elements scanning in a direction opposite to the moving direction of the light blocking object.

6. A coordinate position detecting method using a plurality of light emitting elements and a plurality of light receiving elements located on mutually opposite sides, all the elements being arranged at a predetermined interval in horizontal and vertical directions, with each pair of mutually opposed light emitting element and light receiving element forming a light beam path, such that the coordinate position of a light blocking object can be detected once the light beam path is blocked, said method comprising:

storing N previous coordinate datas obtained when detecting a movement of the light blocking object, using n ($1 \leq n \leq N$) coordinate datas of the N previous coordinate datas to calculate a coordinate position of the light blocking object; and changing the number of the coordinate datas for use in calculating the coordinate position, in accordance with a speed of the movement of the light blocking object, said method further comprising:

setting a first mode for successively rendering light emitting elements (in a first range including all the light emitting elements) to emit light beams to perform scanning operation, and for calculating a coordinate position at which a light beam is blocked; and setting a second mode for successively rendering light emitting elements (in a second range which is smaller than the first range but including a light emitting element corresponding to a beam-blocked position) to emit light beams and for calculating a coordinate position at which a light beam is blocked;

wherein after a beam-blocked position is calculated in the first mode, another beam-blocked position is calculated in the second mode, and when a moving speed of the light blocking object is high, the number of coordinate datas for use in forming the said coordinate position is reduced, when the moving speed of the light blocking object is low, the number of coordinate datas for use in forming the said coordinate position is increased.

7. A coordinate position detecting method according to claim 6, wherein the number of the light emitting elements scanning in the moving direction of the light blocking object is made larger than the number of the light emitting elements scanning in a direction opposite to the moving direction of the light blocking object.

8. A coordinate position detecting method using a plurality of light emitting elements and a plurality of light receiving elements located on mutually opposite sides, all the elements being arranged at a predetermined interval in horizontal and vertical directions, with each pair of mutually opposed light emitting element and light receiving element forming a light beam path, such that the coordinate position of a light blocking object can be detected once the light beam path is blocked, said method comprising:

storing N previous coordinate datas obtained when detecting a movement of the light blocking object, using n ($1 \leq n \leq N$) coordinate datas of the N previous coordinate datas to calculate a coordinate position of the light blocking object; and changing the number of the coordinate datas for use in calculating the coordinate position, in accordance with a speed of the movement of the light blocking object, said method further comprising:

setting a first mode for successively rendering light emitting elements (in a first range including all the light emitting elements) to emit light beams to perform scanning operation, and for calculating a coordinate position at which a light beam is blocked; and setting a second mode for successively rendering light emitting elements (in a second range which is smaller than the first range but including a light emitting element corresponding to a beam-blocked position) to emit light beams, and for calculating a coordinate position at which a light beam is blocked, further for reducing and rendering light emitting elements (in the first range not including the second range) to emit light beams so as to detect the coordinate position of the light blocking object, wherein after a beam-blocked position is calculated in the first mode, another beam-blocked position is calculated in the second mode, and when a moving speed of the light blocking object is high, the number of coordinate datas for use in forming the said coordinate position is reduced, when the moving speed of the light blocking object is low, the number of coordinate datas for use in forming the said coordinate position is increased.

9. A coordinate position detection method according to claim 8, wherein during the second mode, the number of the light emitting elements scanning in the moving direction of the light blocking object is made larger than the number of the light emitting elements scanning in a direction opposite to the moving direction of the light blocking object.

10. A display apparatus involving the use of the method according to any one of claims 1, 6 and 8, said apparatus comprising:

a plurality of light emitting elements arranged on one side of two mutually opposed lines, and capable of emitting infrared light beams;

a plurality of light receiving elements arranged on the other side of the two mutually opposed lines, and capable of receiving infrared light beams; and a controller connected respectively with the light emitting elements and the light receiving elements.

* * * * *